United States Patent [19]
Ito et al.

[11] Patent Number: 4,957,350
[45] Date of Patent: Sep. 18, 1990

[54] LIQUID CRYSTAL DISPLAY DEVICE

[75] Inventors: Hiroshi Ito; Masaru Kugo; Michiaki Kurosawa, all of Ibaraki, Japan

[73] Assignees: Hitachi, Ltd, Tokyo; Hitachi Automotive Engineering, Ibaraki, both of Japan

[21] Appl. No.: 274,833

[22] Filed: Nov. 22, 1988

[30] Foreign Application Priority Data

Nov. 24, 1987 [JP] Japan .................. 62-294110

[51] Int. Cl.$^5$ .............................................. G02F 1/133
[52] U.S. Cl. .................. 350/336; 350/339 F
[58] Field of Search ..................... 350/336, 339 F

[56] References Cited

U.S. PATENT DOCUMENTS

| | | | |
|---|---|---|---|
| 4,389,095 | 6/1983 | Teshima et al. | 350/334 |
| 4,697,886 | 10/1987 | Ito et al. | 350/336 |
| 4,902,103 | 2/1990 | Miyake et al. | 350/336 |

FOREIGN PATENT DOCUMENTS

| | | | |
|---|---|---|---|
| 0036750 | 3/1979 | Japan | 350/336 |
| 0043047 | 4/1979 | Japan | 350/336 |
| 0007613 | 1/1983 | Japan | 350/336 |
| 0102627 | 5/1986 | Japan | 350/336 |

Primary Examiner—Stanley D. Miller
Assistant Examiner—Anita Pellman Gross
Attorney, Agent, or Firm—Antonelli, Terry, Stout & Kraus

[57] ABSTRACT

A liquid crystal color display element has striped red, green and blue color filters and comb electrodes corresponding to the respective red, green and blue color filters. At least two of the comb electrodes are connected in parallel and interleaved with an independent electrode composed of the remaining comb electrode.

4 Claims, 4 Drawing Sheets

| DISPLAY COLOR \ SEGMENT | (R) | (GB) |
|---|---|---|
| RED | ON | OFF |
| BLUE-GREEN | OFF | ON |
| WHITE | ON | ON |
| OFF | OFF | OFF |

| DISPLAY COLOR | SEGMENT | (R) | (GB) |
|---|---|---|---|
| RED | | ON | OFF |
| BLUE-GREEN | | OFF | ON |
| WHITE | | ON | ON |
| OFF | | OFF | OFF |

| DISPLAY COLOR | COMMON (GB) | COMMON (RG) | SEGMENT (R) | SEGMENT (GB) |
|---|---|---|---|---|
| RED | 0 | 0 | 1 | 0 |
| BLUE-GREEN (1) | 0 | 0 | 0 | 1 |
| WHITE | 0 | 0 | 1 | 1 |
| OFF | 0 | 0 | 0 | 0 |
| AMBER | 1 | 0 | 1 | 1 |
| BLUE-GREEN (2) | 0 | 1 | 1 | 1 |

LIQUID CRYSTAL DISPLAY DEVICE

BACKGROUND OF THE INVENTION

The present invention relates to a liquid crystal display device and, particularly, to a liquid crystal color display device having a plurality of different color filters so that a variable color display is possible.

An example of a conventional liquid crystal color display device is shown in Japanese Patent Application Laid-open No. 83721/1987. In this conventional device, an electrode on one of opposingly arranged two substrates constituting the liquid crystal display device is comb-shaped and any one of three colors can be displayed selectively by a use of two color filters.

That is, the conventional device is capable of displaying either of red, green or yellow which is a mixture of red and green and, with change of combination of colors of the filters, it is possible to display other colors as well. However, the conventional device can not display white color. That is, in order to display white, three colors, red (R), green (G) and blue (B), must be provided simultaneously. In order to realize such simultaneous color generation in the conventional device, a pattern of the electrode becomes very complicated and some portions thereof must be overlapped necessarily, resulting a double electrode layer through an insulating layer.

SUMMARY OF THE INVENTION

An object of the present invention is to provide a liquid crystal display device which has a simple structure and is capable of displaying any of a plurality colors including white, selectively.

According to the present invention, the above object can be achieved by that striped electrodes constituting display segments formed on either of opposing two substrates are made correspondent in shape to striped color filters R, G and B, respectively, that two of the three segments are electrically connected as a single striped electrode for two colors and the remaining segment is interleaved with the two segments and that a common electrode which determines a shape of display segment is formed on the other substrate.

Since two of the striped electrodes corresponding to R, G and B, respectively, are connected commonly, it is possible to pattern a display with a simple comb structure including a single electrode pattern and a composite two electrode pattern interleaved with the single electrode pattern. Therefore, the problem of overlapping of the electrode patterns is eliminated. By controlling voltage applied across the common electrode and the segment electrodes, white display with simultaneous energization of the three electrodes, two color display of the parallel connected electrodes or a single color display of the single electrode can be performed selectively.

DETAILED DESCRIPTION OF THE PREFERRED EMBODIMENT

Figure 2:
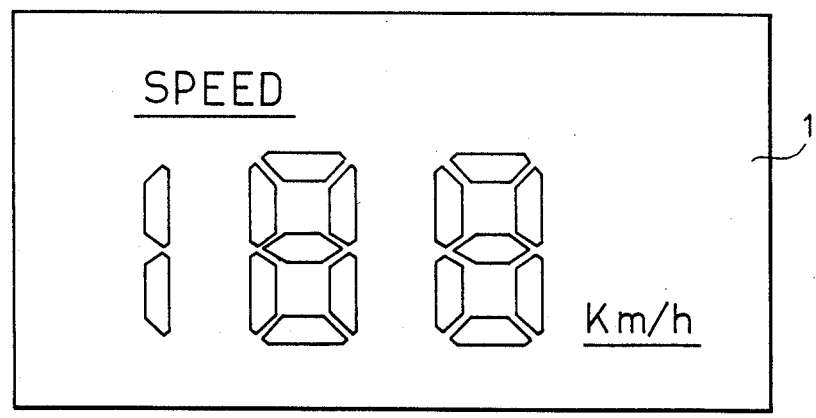
FIG. 2 is a plan view of an example of display by means of a plurality of display elements each having a structure such as shown in FIG. 1.

An example of display of a liquid crystal display element 1 when applied to a digital speed meter of an automobile is shown in FIG. 2. A numeral "8" is composed of seven segments 1a to 1g, for example.

Figures 3, 4:
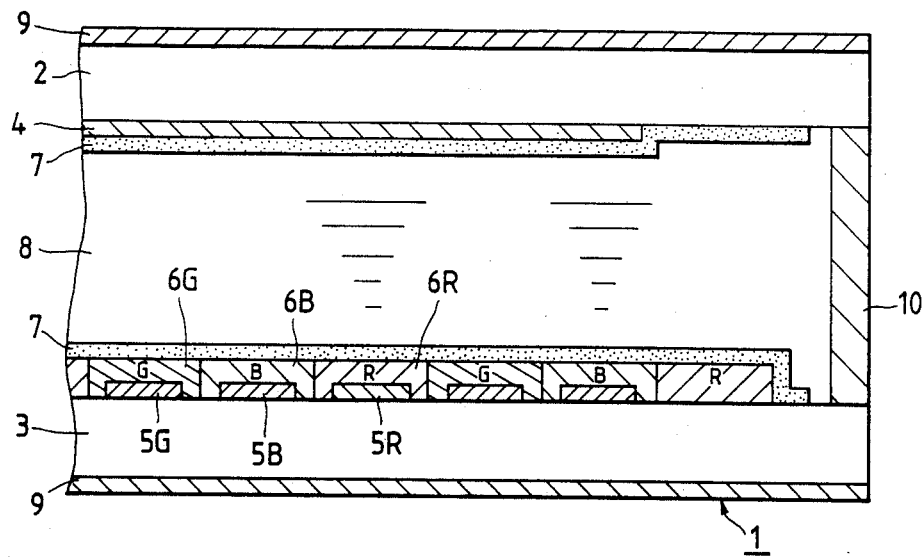
FIG. 3 is a cross section of the element shown in FIG. 2.
FIG. 4 illustrates an operation of the element shown in FIG. 2.

A cross section of the element 1 is shown in FIG. 3. In FIG. 3, comb shaped segment electrodes 5G, 5B and 5R are formed on an inside surface of a lower glass substrate 3. On the segments 5G, 5B and 5R, a green, a blue and a red color filters 6G, 6B and 6R are formed, respectively. An orientation control membrane 7 is provided on the color filters 6G, 6B and 6R for controlling orientation of liquid crystal molecules. A common electrode 4 is formed on an inside surface of an upper glass substrate 2 opposing to the lower substrate 3 and an orientation control membrane 7 covers the opposing surface of the upper glass substrate. A space defined between the inside surfaces of the upper and the lower glass substrates 2 and 3 is filled with liquid crystal 8 and sealed by a sealing member 10. Polarizer plates 9 are provided on outside surfaces of the glass substrates 2 and 3, respectively.

Figure 1:
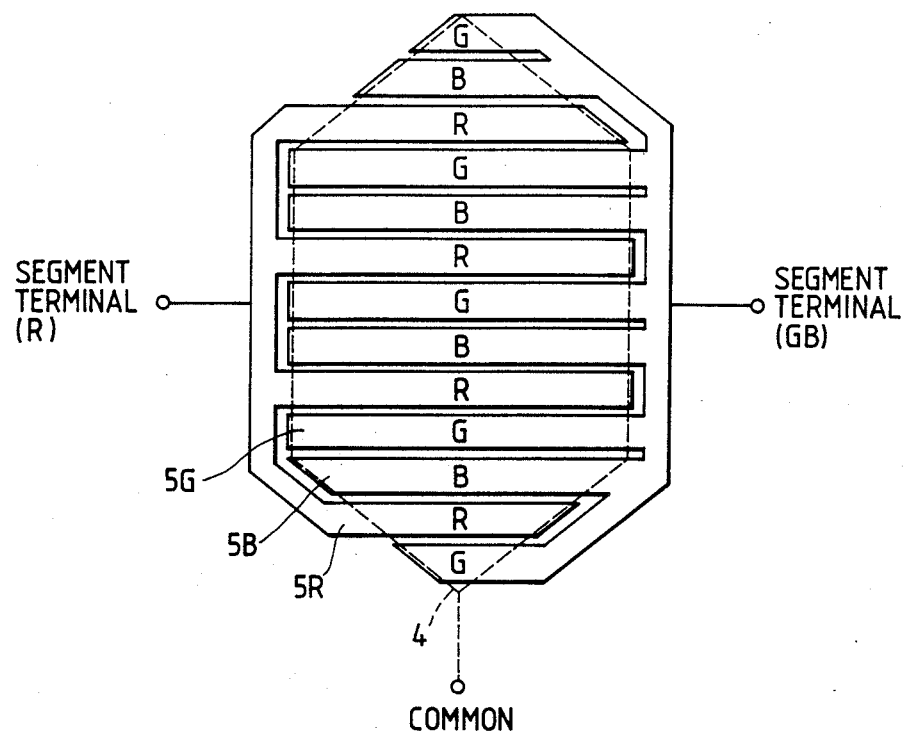
FIG. 1 shows an embodiment of a liquid crystal display element according to the present invention in an enlarged plan view.

In FIG. 1 which is a plan view of the element shown in FIG. 3, showing the segment electrodes 5G, 5B and 5R and the common electrode 4, the segment electrodes 5G and 5B are commonly connected to a common segment terminal GB and the segment electrode 5R is connected to a segment terminal R. As shown, the segment electrodes 5G, 5B and 5R constitute the comb type display segment 1 shown in FIG. 2. The common electrode 4 determines a display segment shape.

With this construction, white display with simultaneous energization of the three electrodes, two color display of the parallel connected electrodes or a single color display of the single electrode can be performed selectively, by controlling voltage applied across the common electrode 4 and the segment terminals R and GB. That is, a red color display is realized by applying a voltage between the terminal R and the common electrode 4, a blue-green display with a voltage between the terminal GB and the common electrode 4 and white display with voltages between the common electrode 4 and the terminals R and GB. FIG. 4 summarizes the above color displays.

Figures 5, 6:
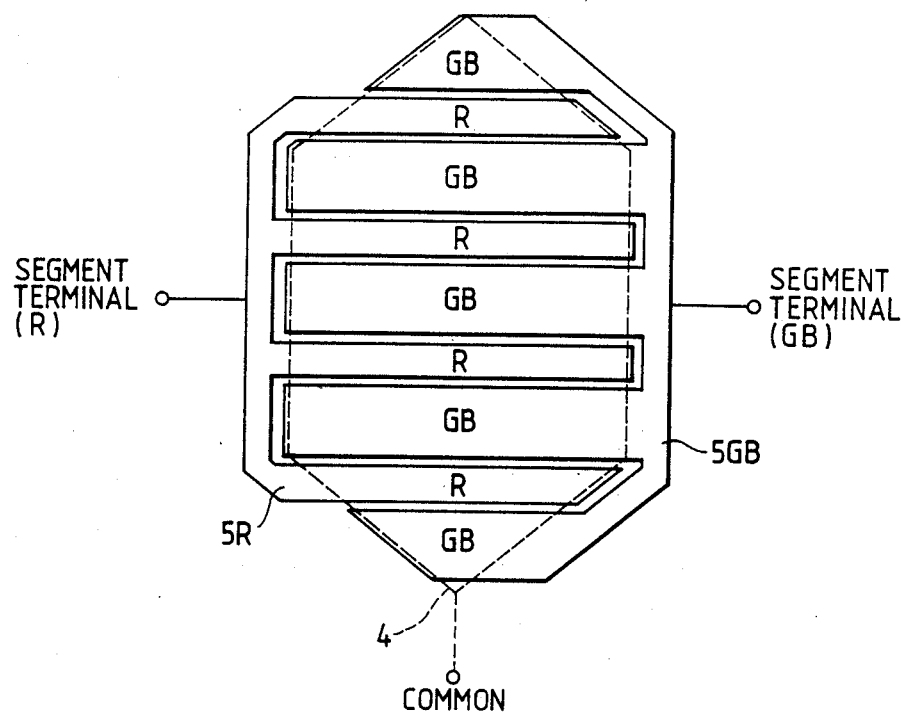
FIG. 5 is a plan view showing another embodiment of the present invention.
FIG. 6 illustrates an operation of the embodiment shown in FIG. 5.

FIG. 5 is similar to FIG. 1 and shows another embodiment of the present invention in which the segment electrodes 5G and 5B of the embodiment in FIG. 1 are made integral to form a thicker segment 5GB and a color filter corresponding to the segment electrode 5GB has a blue-green color. A segment electrode 5R and its color filter 6R are the same as those shown in FIG. 1. The segment electrode 5GB and 5R are interleaved with each other and, together with the corresponding color filters, form a display segment.

In the construction shown in FIG. 5, any of colors listed in FIG. 6 can be displayed selectively by controlling voltage applied between a common electrode 4 and the segment electrodes 5R and 5GB. That is, a red display is realized by applying a voltage only between the common electrode 4 and the segment electrode 5R, a blue-green display with a voltage applied between the common electrode 4 and the segment electrode 5GB and a white display with voltages applied between the common electrode 4 and the segment electrodes 5R and 5GB.

Figures 7, 8:
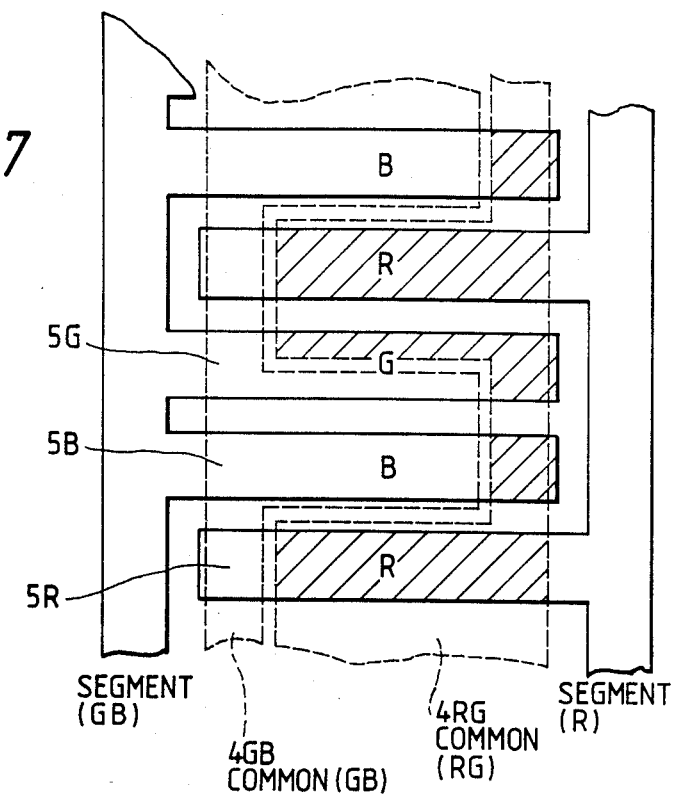
FIG. 7 is an enlarged plan view showing another embodiment of the present invention.
FIG. 8 illustrates an operation of the element shown in FIG. 7.

FIG. 7 is an enlarged view of a portion of another embodiment of the invention. In FIG. 7, the common electrode 4 used in the embodiment shown in FIG. 1 is divided to a pair of common electrode pieces 4RG and 4GB in the form of mutually interleaved combs as shown by dotted lines so that only each segment electrode 5G is covered by both of the common electrode pieces 4RG and 4GB equally while segment electrodes 5R are covered by one (4RG) of the common electrode pieces mainly and segment electrodes 5B are covered by the other common electrode piece (4GB) mainly, respectively.

FIG. 8 is a table showing an operation of the color display element shown in FIG. 7, in which "0" shows a state of an electrode to which a rectangular signal having a 50% duty cycle is applied and "1" shows another state of the electrode when a rectangular signal opposite in phase to the signal is applied. As shown, a red color is displayed when the segment electrode 5R is "1" and the remaining electrodes are "0", a blue-green display when the segment electrode 5GB is "1" and the remaining electrodes are "0", a white display when both of the segment electrodes 5R and 5GB are "1" and the remaining electrodes are "0", an amber color display when the common electrode piece 4GB is "1" and the remaining electrodes are "0", since substantial areas of the segment electrodes 5R, small areas of the segment electrodes 5B and intermediate areas of the segment electrodes 5G are become active as shown by a hatched portion in FIG. 7, and a blue-green display when the common segment electrode piece 4GB is "0" and the remaining electrodes are "1".

As described hereinbefore, according to the present invention, it is possible to obtain a plurality of color displays including a white color display selectively with a simple construction of electrodes and a simplified control thereof.

What is claimed is:

1. A liquid crystal color display element comprising a common electrode, striped red, green and blue color filters and comb electrodes opposing to said common electrode through said red, green and blue color filters, respectively, at least two of said comb electrodes being connected in parallel and interleaved with the remaining comb electrode.

2. The liquid crystal color display element claimed in claim 1, wherein said at least two comb electrodes connected in parallel are associated with said green and blue color filters, respectively.

3. The liquid crystal color display element claimed in claim 2, wherein said at least two comb electrodes connected in parallel are formed integrally and said green and blue color filters associated therewith are combined to form blue-green color.

4. The liquid crystal color display element claimed in any of claims 1 to 3, wherein said common electrode is divided into a plurality of common electrode pieces each covering a substantial portion of one of said comb electrodes and a portion of another of said comb electrodes.

* * * * *